United States Patent
Shambaugh et al.

(10) Patent No.: US 6,598,021 B1
(45) Date of Patent: Jul. 22, 2003

(54) METHOD OF MODIFYING SPEECH TO PROVIDE A USER SELECTABLE DIALECT

(76) Inventors: Craig R. Shambaugh, 2223 Barger Ct., Wheaton, IL (US) 60187; Anthony Dezonno, 233 Pinewood La., Bloomingdale, IL (US) 60108; Mark J. Power, 1332 Yorkshire La., Carol Stream, IL (US) 60188; Kenneth Venner, 26W158 Houghton Ct., Winfield, IL (US) 60190; Jared Bluestein, 152 Thurlow St., Plymouth, NH (US) 03264; James Martin, 401 Allen Rd., Woodside, CA (US) 94062; Darryl Hymel, 38W240 Christina Ct., Batavia, IL (US) 60510; Laird C. Williams, 6N486 W. Ridgewood Dr., St. Charles, IL (US) 60175

( * ) Notice: Subject to any disclaimer, the term of this patent is extended or adjusted under 35 U.S.C. 154(b) by 281 days.

(21) Appl. No.: 09/615,392

(22) Filed: Jul. 13, 2000

(51) Int. Cl.[7] ............................................... G10L 21/00
(52) U.S. Cl. ..................... 704/270; 704/257; 379/88.06
(58) Field of Search ................................. 704/256, 257, 704/270, 275, 260, 266; 378/88.01, 88.06

(56) References Cited

U.S. PATENT DOCUMENTS

| | | | | |
|---|---|---|---|---|
| 5,561,736 A | * | 10/1996 | Moore et al. | ................ 704/260 |
| 5,721,938 A | * | 2/1998 | Stuckey | ....................... 395/754 |
| 6,185,535 B1 | * | 2/2001 | Hedin et al. | ................. 704/270 |
| 6,374,224 B1 | * | 4/2002 | Horiguchi et al. | .......... 704/266 |

* cited by examiner

*Primary Examiner*—Susan McFadden

(57) ABSTRACT

A method and apparatus for adjusting a dialect for an oral presentation provided by an agent of an organization to a human target of the organization through a communications network. The method includes the steps of determining a dialect to be used by the agent for communicating with the target, modifying the dialect of the oral presentation of the agent for communicating with the target based upon the determined dialect and presenting the modified oral presentation to the target.

17 Claims, 2 Drawing Sheets

FIG. 3

METHOD OF MODIFYING SPEECH TO PROVIDE A USER SELECTABLE DIALECT

FIELD OF THE INVENTION

The field of the invention relates to communication systems and more particularly to telemarketing devices.

BACKGROUND OF THE INVENTION

Telephone devices used for telemarketing are generally known. Such devices may operate to process either incoming or outgoing calls. In the simplest case, an organization controlling the telemarketing process may provide a bank of telephones and a corresponding group of agents to man the bank of telephones. As calls come in, an agent may answer the call and respond to concerns of the caller. When an agent is idle, the organization may provide an outgoing list of customer contacts, which the agent may call when the agent is otherwise not occupied.

In more sophisticated organizations, an automatic call distributor (ACD) may be provided to route calls to idle agents. The ACD may be connected to the public switched telephone network (PSTN) through one or more trunk lines. Often a single telephone number is disseminated to the public for purposes of contacting the organization. The PSTN, upon detecting the disseminated telephone number, routes the calls to the ACD through the one or more trunk lines.

Along with delivery of a call, the PSTN may also deliver information about an incoming call along with the call. For example, a dialed number identification service (DNIS) utility provides a number dialed by the caller along with the delivered call. Such a utility is important where the organization has a number of departments within the organization, each charged with handling a different subject matter with regard to incoming calls.

Another utility operating from within the PSTN is automatic number identification (ANI). ANI delivers a telephone number of a caller along with a call. ANI may be used by a ACD to identify a customer at the instant of call arrival, instead of after the call is answered by an agent.

By relying upon such information as DNIS and ANI, a controller of the ACD may select an agent who is most qualified to answer a call based upon a number dialed or upon an identity of the caller. Further, using ANI, customer records can be retrieved and displayed for the benefit of an selected agent at the same instant as call arrival.

While telemarketing organizations using ACDs are relatively efficient, there is a growing tendency to maximize resources within such organizations. ACDs are often used to receive and place calls over broad areas resulting in an increased workload and the interaction of agent and customers of different cultures and dialects.

Because of the increased competition among businesses, it is increasingly necessary for a merchant to minimize perceived cultural differences between its agents and customers. Accordingly, a need exists for a means of controlling regional source indicators within agent speech.

SUMMARY

A method and apparatus are provided for adjusting a dialect for an oral presentation provided by an agent of an organization to a human target of the organization through a communications network. The method includes the steps of determining a dialect to be used by the agent for communicating with the target, modifying the dialect of the oral presentation of the agent for communicating with the target based upon the determined dialect and presenting the modified oral presentation to the target.

BRIEF DESCRIPTION OF THE DRAWINGS

FIG. 3 is block diagram of use of the system of FIG. 1 under an alternate embodiment.

DETAILED DESCRIPTION OF A PREFERRED EMBODIMENT

Figure 1:
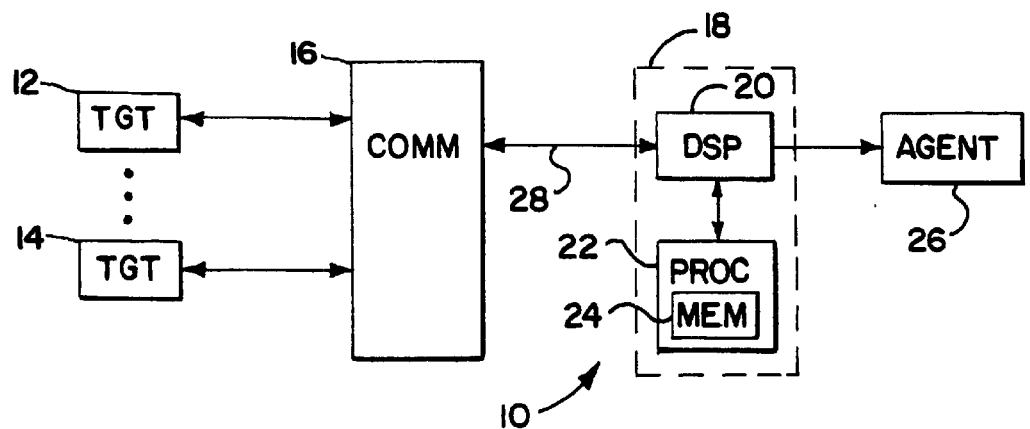
FIG. 1 is a block diagram of a system for modifying the dialect of an oral presentation, shown in a context of use, in accordance with an illustrated embodiment of the invention.

FIG. 1 is a block diagram of an apparatus 10 for modifying a content (i.e., a dialect) of an oral presentation of an agent (e.g., a telemarketer), generally in accordance with an illustrated embodiment of the invention. In its simplest form, modification of the agent's oral presentation could be described as a filter which is used to control and alter a regional source content of an agent's voice. The filter may be triggered by any of a number of factors. For example, source information (e.g., ANI or DNIS information from a PSTN) may be used as regional indicators. Alternatively, voice recognition may be used to analyze and detect a dialect.

The system 10 may be connected to a communication system (COMM) 16 through an appropriate connection (e.g., a single telephone line or one or more trunk lines) 28. The COMM 16, in turn, may be connected to one or more human targets (e.g., customers, clients, supporters, etc.) 12, 14 of the organization. The target telephone and user of the target telephone will sometimes hereinafter be referred to together simply as the "TGT 12, 14".

Included within the system 10 is a telephone 26 that may be used by an agent of the organization (the agent and his telephone will sometimes hereinafter also be referred to together simply as the "agent 26"). While the system 10 is shown as including a single agent 26, it should be understood that the system 10 may include many agents 26.

Figure 3:
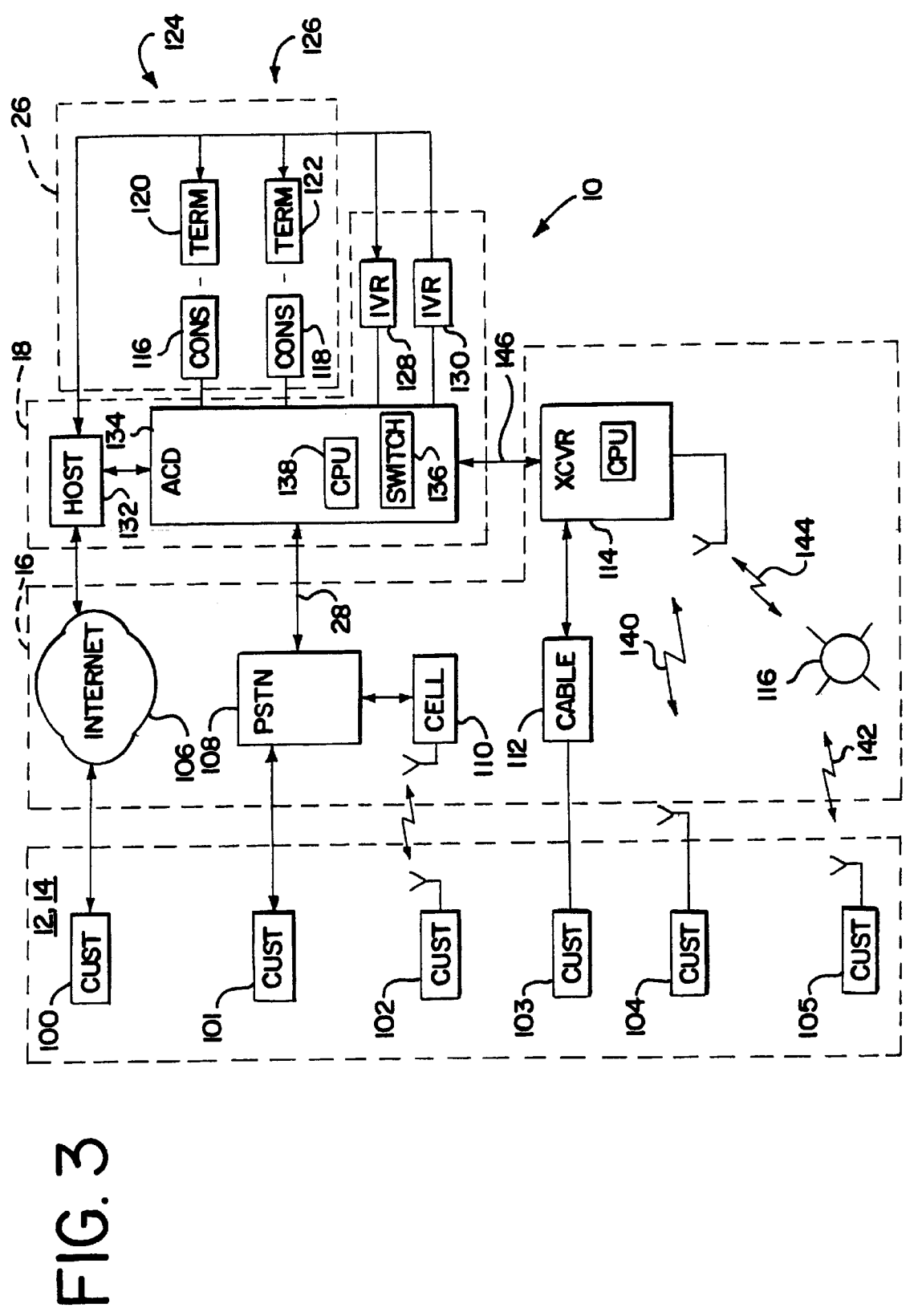

It should also be understood that the system 10 may be implemented in many different forms. For example, the system 10 may include a transaction processor 18 (e.g., an ACD) supporting a number of connected agents 26. Further, the COMM 16 and ACD 18 may be implemented as part of a larger system, such as is shown in FIG. 3. To reflect the clearly commercial nature of the illustrated embodiment of FIG. 3, the TGT 12, 14 of FIG. 1 are referred to as customers (CUSTs) 100–105. Further, the agents 26 may now communicate with customers 100–105 through respective agent stations 124, 126. An agent 26 at an agent station 124, 126 may communicate with a customer 100–105 through a telephone console 116, 118 or through a terminal 120, 122 using voice-over-IP (VOIP).

The system of FIG. 3 may be used to route calls from any of a number of sources (e.g., through the PSTN, Internet, cellular telephone system, cable TV system, radio, satellite, etc.). As used herein, a call may be based on a switched circuit connection (i.e., through the PSTN) or a packet connection (e.g., through the Internet). A switched circuit connection (also sometimes referred to simply as a "telephone connection" in the telephony arts) refers to a dedicated channel existing between two parties. As used herein, a packet connection does not represent a physical connection, but simply the possession and concurrent use by two users of the other user's IP address for the exchange of voice information.

Under the illustrated embodiment, calls may be received from customers 100–105 and be routed to a selected transaction processing entity (e.g., agent stations 124, 126 or interactive voice response units (IVRs) 128, 130) by the transaction processing system 18.

Switched circuit calls with customers 100–105 placed through the ACD 134, may be routed by matrix switch 136 of the ACD 134 to a console 116, 118 of the agent 26 or to an appropriate IVR 128, 130. Calls through the Internet 106 may occur as voice over IP. When received, the host 132 may route the VOIP call to a terminal 120, 122 of an agent 26.

A customer 100–105 may use a conventional telephone or cell phone and/or a computer to place/receive a call with the transaction processing system. Alternatively, the customer 100–105 may place/receive a call using an interactive channel of a community antenna television (CATV) system 112, land mobile radio 140 or a transmission channel 142, 144 of a satellite 116. Where the customer 100–105 places a call using an interactive channel of a community antenna television (CATV) system 112, land mobile radio 140 or a transmission channel 142, 144 of a satellite 116, it may be assumed that such call is initiated by the entry of a target identifier (e.g., a telephone number of the ACD 134) using a conventional touch-tone pad.

While the term "caller" may herein sometimes by used to refer to the customer 100–105 it should be understood that calls may just as well be initiated by the transaction processing system 134. For example, customer lists may be maintained in a database of the host 132. Outgoing calls from the system 10 may be initiated to the customers 100–105 by the CPU 138 through the PSTN 108, radio frequency (rf) transceiver 114 or by the host 132 through the Internet 106.

Associated with each customer 100–105 is an identifier and call routing information. The identifier may be an identifier used for identifying the customer 100–105 within a particular communication system (e.g., a telephone number within the PSTN 108, an IP address within the Internet 106, a customer account number within the CATV system 112, an electronic serial number (ESN) within the land mobile radio 140 or satellite system 116, etc.).

The routing information may be used to identify the particular system (e.g., PSTN 108, Internet 106, CATV 112, land mobile radio 140, satellite 116, etc.) within which the identifier is to be used. In the case of the transaction processing system 134, the routing information may simply identify the port through which the call is to be processed. For example, a port for an Internet call may be an Internet connection with the host 132. A telephone call may be processed through a first set of trunk connections 28 using a respective port of a switch 136 of the ACD 134. A call with a cable subscriber 103, land mobile user 104 or satellite customer 105 may be processed through a second set of trunk connections 146 using a respective port of the switch 136 of the ACD 134. The identifier and call routing information may, together, be referred to herein as call associated information.

Whether a call is incoming or outgoing, the distribution of the call may be substantially the same. When the call is outgoing, the transaction processing system 18 inherently knows the identity of the call target. When the call is incoming, the transaction processing system 18 may determine the identity of the caller based upon other call associated information (e.g., a port number and ANI or IP address information in the case of the PSTN or Internet). By knowing the identity of a customer 100–105, the transaction processing system 18 may route the call based upon the historical needs of the customer 100–105 or some other well-known criteria.

Call delivery to a transaction processing entity 26 may be accomplished under several formats. Where the call is a switched circuit call, the CPU 138 selects an agent and delivers the call to the console 116, 118 of the selected agent or to the selected IVR 128, 130. The CPU 138 may send a call delivery message including the call associated information to the host 132. Where the host 132 is able to identify customer records, the host 132 may present those records to the selected agent 26 at the instant of call delivery (e.g., as a screen pop on a terminal 120, 122 of the selected agent).

Where a call is through the Internet, presentation may be entirely through the terminal 120, 122 of the selected agent. Where the call is in the form of a web telephony call, the host 132 may forward the IP address of the requester to the selected agent. Where the host 132 is able to identify customer records, those records may be presented to the agent along with the web telephony request.

As an alternative to the system of FIG. 3, the transaction processor 18 may be implemented (as suggested by FIG. 1) on a personal computer (PC) as a call processor 18 with a single connected agent 26. Where the call processor 18, is implemented as an ACD with a number of connected agents 26, it should be understood that each agent may serve a different organization. Further, even where a single agent 26 is involved, the organization objective may differ depending upon the call target 12, 14.

The system 10 may be used to serve any of a number of organizational objectives. As used herein, an organizational objective means any functional activity directed to achieving the goals of the organization. Further, it is to be understood that functional activities may be achieved through contacts between agents of the organization and targets of the organization. Typically the outside contact includes an oral presentation by an agent 26 of the organization or an oral exchange between the agent 26 and a human organizational TGT 12, 14 regarding a product of the organization, without regard to who initiated the contact.

For example, if the organization using the system 10 is a merchant, then the organizational objective would be sales and the contact would be between a salesman or solicitor 26 and a member of the general public (i.e., TGT 12, 14). Alternatively, if the organization is a charitable organization, then the organizational objective may be collecting donations and the contact would, again, be through a solicitor.

If the organization were a political party, then the organization objective would be winning an election or influencing a vote. If the organization were an environmentalist group, then the organizational objective may simply be public awareness.

Organizational objectives may be further advanced by adjusting a content to eliminate perceived cultural differences from contacts between the agents 26 and TGTs 12, 14. It should be understood in this regard that the adjustment of a content of an oral presentation is limited only to the speech of the agent 26 of the organization and not to the organizational target. It should also be understood that, as used herein, "presentation" is intended to include an agent's participation in a two-way conversation and is specifically not limited to (but could include) a one-sided sales pitch by the agent of the organization's message to the TGT 12, 14.

Under the illustrated embodiment, as calls are detected, the call processor 18 may select different dialects based upon call-associated information. In this regard, a call analyzer 46 may be used to determine a dialect to be used by the agent 26 for communicating with the TGT 12, 14. Where the call is an incoming telephone call, the call-associated information may be DNIS or ANI information. Where the call is an outgoing telephone call, the call-associated information may be the telephone number called.

Where the call-associated information is based upon DNIS information, the processor 22 may select a dialect based upon the DNIS information from the PSTN 16. For example, a particular organization may disseminate different telephone numbers in different marketing locals. A dialect may be selected based upon the marketing local associated with of the call.

Figure 2:
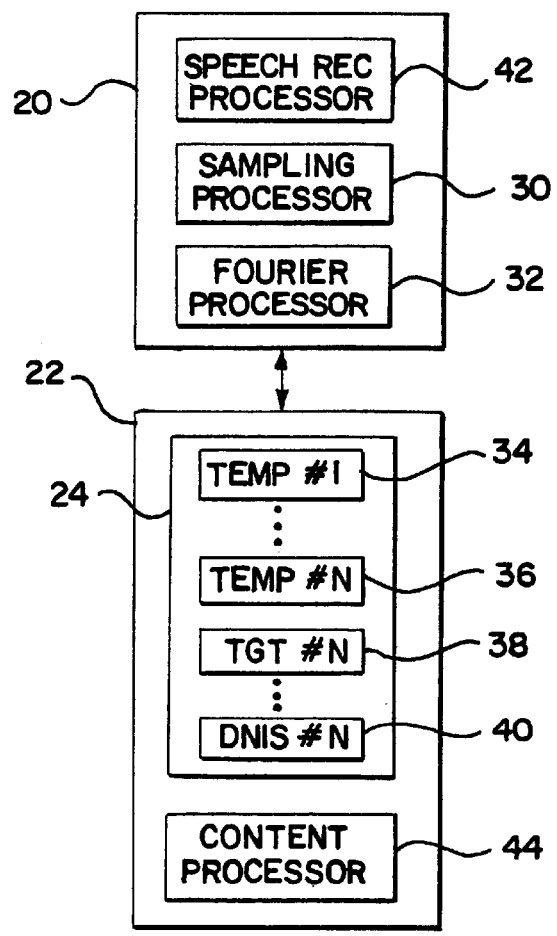
FIG. 2 is a block diagram of processors and memory used by the system of FIG. 1.

Similarly, where the call-associated information is ANI or an outgoing dialed number, the dialect may be based upon the regional identifiers (e.g., the area code) of the number or upon experience with the TGT 12, 14. Using the call-associated information, an initial determination of dialect may be made. Following the initial determination of dialect, a dialect file 38, 40 (FIG. 2) defining the dialect for the call may be retrieved based upon the call-associated information. The file 38, 40 may include a set of dialect parametric values to be used for the call. The parametric values may define the dialect and may be predetermined for each type of call associated information and may be stored within memory 24.

The call content parametric values defining a dialect may be delineated by any of a number of speech attributes. Word rate may be one attribute used to define a dialect. Word choice and inflection may be other attributes. Software that may be used to define the parametric values of dialects (or recreate a dialect using the defined parameters) may be obtained from any of a number of sources (e.g., http://faculty.washington.edu/dillon/PhonResources/PhonResources.html, http://www.linguasphere.org/, etc.)

Once the parametric values defining the dialect has been retrieved, the call processor 18 may connect the call to the agent 26 and begin detecting a word content of the call. To being detecting a content of the call, a digital signal processor (DSP) 20 (functioning as a sampling processor) may begin sampling a voice signal from the agent and a voice signal from the TGT 12, 14. The sampled signals from the agent 26 and TGT 12, 14 may then each be converted into a voice profile within a Fourier processor 32 using a fast Fourier transform (FFT).

Using the voice profile of the TGT 12, 14, a word recognition (e.g., a speech recognition) processor 42 may be used to determine a word content and a dialect being used by the TGT 12, 14. Where the detected dialect of the TGT 12, 14 differs from the dialect of the initial determination, a new dialect file 38, 40 may be retrieved. The detected word content and dialect may be stored in memory 24 for later use as discussed below.

Next, the voice profile of the agent 26 may also be applied to the word recognition processor 42 to detect a content of the oral presentation of the agent. The content may include a word content, a word rate and a dominant frequency.

Under one illustrated embodiment, the dialect of the agent 26 and TGT 12, 14 may each be determined. The determination of the original dialect of the agent may be used to improve system performance by detecting and imparting additional meaning to the agent's word choice. Alternatively, only the dialect of the TGT 12, 14 need be determined. Once determined, each word of the agent 26 may be adjusted to conform to the determined dialect of the TGT 12, 14.

Where the dialect of both the agent 26 and TGT 12, 14 are determined, the voice profiles of the agent 26 may be compared with the contents of a selected one of the dialect files 38, 40 in a content processor 44 to determine whether any modification or adjustments are in order. Modification of the content of the agent's presentation may be performed on a word-by-word basis or upon an entire word stream from the agent based upon the content of the selected dialect file 38, 40.

A dialect of the agent 26 may be matched to the TGT 12, 14 using templates 34, 36 and/or software (as discussed above) designed for generating a particular dialect. Where the dialect file 38, 40 requires or where the recognized dialect of the TGT 12, 14 suggests a particular dialect, the processor 22 may modify the agent's presentation to match that dialect. Such matching may be accomplished by first recognizing each word from the agent 26 and then selecting a template for the corresponding word in the particular dialect required. The template may then be used as a means for substituting a synthesized word of the proper dialect for the recognized word spoken by the agent 26.

The templates may be implemented under any of a number of different methods. For example, a word template may be based upon recordings of words spoken under different dialects. As above, the words of the different dialects may be sampled and converted using a FFT into word profiles. A dominant frequency of the profiles may be shifted up or down to match the agents normal tone of voice and converted back into an audio presentation using an inverse FFT.

Regionally specific words may be added or substituted where required by the dialect file 38, 40. For example, some words (e.g., license plate and tag) have different meanings in different locals. Regionally specific words may also be used as indicia of dialect when detected in the speech of a TGT 12, 14 and agent 26. Regionally specific words may also be inserted into the speech of the agent 26 to achieve the intended dialect.

Under the illustrated embodiment, the initial determination of dialect may be changed based upon the voice profiles from the TGT 12, 14 during the exchange between the agent 26 and TGT 12, 14. Where the determined dialect is later determined to be different than the initially determined dialect, then a different dialect file 38, 40 may be retrieved and substituted as necessary for adjusting the dialect of the agent 26.

A specific embodiment of a method and apparatus of adjusting a dialect of an oral presentation according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of adjusting a dialect for an oral presentation provided by an agent in support of a set of organizational objectives of an organization to a human target of the organization through a communications network, such method comprising the steps of:

determining a dialect used by the target;

modifying the dialect of the oral presentation of the agent made in support of the organizational objectives of the organization to match the dialect of the target to eliminate cultural differences perceived by the target of the organization based upon the determined dialect; and presenting the oral presentation in the modified dialect to the target.

2. The method of selecting a dialect as in claim 1 wherein the step of determining the dialect further comprises retrieving call associated information from the communications network relating to the target.

3. The method of selecting a dialect as in claim 1 wherein the step of modifying the content of the oral presentation further comprises recognizing a spoken word content.

4. The method of selecting a dialect as in claim 3 wherein the step of detecting a spoken word content of the oral presentation further comprises comparing the recognized spoken word content with a set of verbal templates.

5. The method of selecting a dialect as in claim 4 wherein the step of comparing the recognized spoken word content with a set of verbal templates further comprises selecting a template of the set of templates with a nearest match.

6. The method of selecting a dialect as in claim 4 wherein the step of comparing the recognized spoken word content with a set of verbal templates further comprises substituting an equivalent word with the determined dialect.

7. An apparatus for selecting a regional dialect for an oral presentation provided by an agent of an organization to a human target of the organization to eliminate perceived cultural differences through a communications system, such apparatus comprising:

means for determining a regional dialect used by the target;

means for modifying a dialect of the oral presentation of the agent of the organization to match the regional dialect of the target to eliminate perceived cultural differences between the agent and target based upon the determined dialect; and means for presenting the modified oral presentation to the target.

8. The apparatus for selecting a dialect as in claim 7 wherein the means for determining the dialect further comprises means for retrieving call associated information from the communication system relating to the target.

9. The apparatus for selecting a dialect as in claim 7 wherein the means for modifying the dialect of the oral presentation further comprises means for recognizing a spoken word content.

10. The apparatus for selecting a dialect as in claim 9 wherein the means for detecting a spoken word content of the oral presentation further comprises means for comparing the recognized spoken word content with a set of verbal templates.

11. The apparatus for selecting a dialect as in claim 10 wherein the means for comparing the recognized spoken word content with a set of verbal templates further comprises means for selecting a template of the set of templates with a nearest match.

12. The apparatus for selecting a dialect as in claim 9 wherein the means for recognizing the spoken word content further comprises means for substituting an equivalent word with the determined dialect.

13. An apparatus for selecting a regional dialect for an oral presentation provided by an agent of an organization to a human target of the organization to eliminate perceived cultural differences through a communications system, such apparatus comprising:

a call analyzer adapted to determine a regional dialect used by the target;

a voice processor adapted to modify a regional dialect of the oral presentation from the agent of the organization to match the regional dialect of the target to eliminate perceived cultural differences between the agent and target based upon the determined dialect; and a voice synthesizer adapted to present the modified oral presentation to the target.

14. The apparatus for selecting a dialect as in claim 13 wherein the call analyzer further comprises a telephone system interface adapted to receive call associated information from the communication system relating to the customer.

15. The apparatus for selecting a dialect as in claim 14 wherein the voice processor further comprises a word recognition module adapted to recognize a spoken word content of the oral presentation.

16. The apparatus for selecting a dialect as in claim 15 wherein the voice recognizer further comprises a plurality of verbal templates.

17. The apparatus for selecting a dialect as in claim 15 wherein the voice recognizer further comprises a comparison processor adapted to compare the recognized spoken word content with the plurality of verbal templates.

\* \* \* \* \*